(12) United States Patent
Luschi et al.

(10) Patent No.: US 9,184,946 B2
(45) Date of Patent: Nov. 10, 2015

(54) EQUALISER FOR WIRELESS RECEIVERS WITH NORMALISED COEFFICIENTS

(75) Inventors: Carlo Luschi, Oxford (GB); Simon Nicholas Walker, Bristol (GB)

(73) Assignee: Icera, Inc., Wilmington, DE (US)

( * ) Notice: Subject to any disclaimer, the term of this patent is extended or adjusted under 35 U.S.C. 154(b) by 146 days.

(21) Appl. No.: 13/575,576

(22) PCT Filed: Jan. 27, 2011

(86) PCT No.: PCT/EP2011/051163
§ 371 (c)(1),
(2), (4) Date: Jul. 26, 2012

(87) PCT Pub. No.: WO2011/092256
PCT Pub. Date: Aug. 4, 2011

(65) Prior Publication Data
US 2012/0300830 A1    Nov. 29, 2012

(30) Foreign Application Priority Data
Jan. 29, 2010   (GB) .................................. 1001488.4

(51) Int. Cl.
H03H 7/30      (2006.01)
H03H 7/40      (2006.01)
H03K 5/159     (2006.01)
H04L 25/03     (2006.01)

(52) U.S. Cl.
CPC .... *H04L 25/03044* (2013.01); *H04L 25/03159* (2013.01)

(58) Field of Classification Search
CPC .................... H04L 25/03044; H04L 25/03159
USPC .......................................... 375/232, 230, 229
See application file for complete search history.

(56) References Cited

U.S. PATENT DOCUMENTS

| 7,447,117 | B2 | 11/2008 | Yang |
| 8,218,665 | B2 | 7/2012 | Chin et al. |
| 2007/0201548 | A1* | 8/2007 | Badri-Hoeher et al. ...... 375/233 |
| 2008/0075205 | A1 | 3/2008 | Lee et al. |
| 2009/0110048 | A1 | 4/2009 | Luschi et al. |
| 2011/0142025 | A1* | 6/2011 | Agee et al. .................... 370/342 |

FOREIGN PATENT DOCUMENTS

| TW | 200906091 A | 2/2009 |
| WO | 2006056836 A1 | 6/2006 |
| WO | WO 2006056836 A1 * | 6/2006 |
| WO | 2011092256 A1 | 8/2011 |

OTHER PUBLICATIONS

Hooli, K., et al., "Chip-Level Channel Equalization in WCDMA Downlink," EURASIP Journal on Applied Signal Processing, 2002, 14 pages.

* cited by examiner

*Primary Examiner* — Erin File

(57) ABSTRACT

A method, receiver and program for equalising a radio signal comprising a sequence of data samples multiplexed with a sequence of pilot samples. The method comprises: calculating equaliser coefficients by computing cross-correlations of the received signal and known pilot samples available at the receiver and auto-correlations of the received signal; and equalising the received signal using the calculated coefficients.

20 Claims, 2 Drawing Sheets

EQUALISER FOR WIRELESS RECEIVERS WITH NORMALISED COEFFICIENTS

CROSS-REFERENCE TO RELATED APPLICATION

Figure 1:
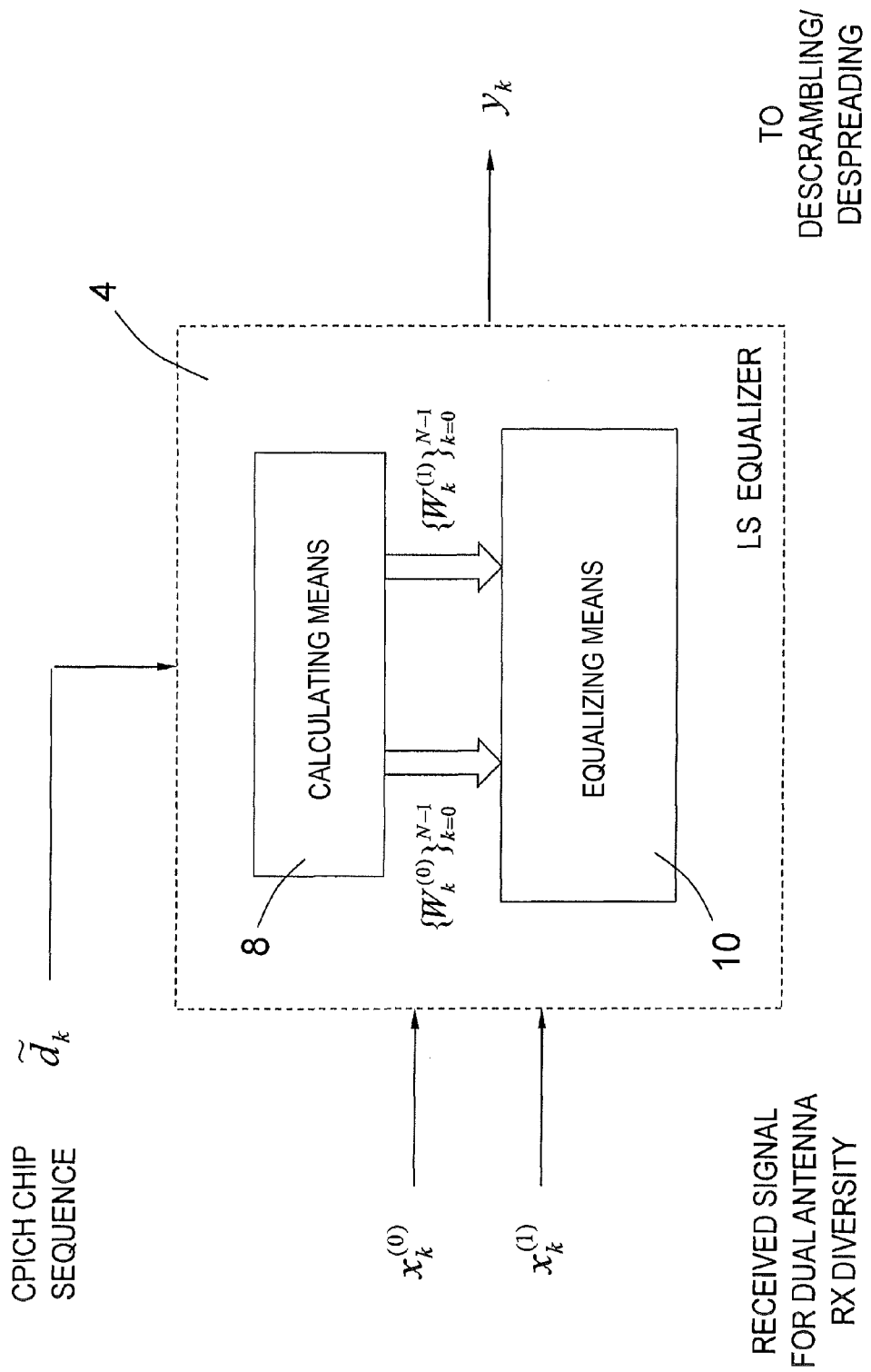

This application is the National Stage of, and therefore claims the benefit of, International Application No. PCT/EP2011/051163 filed on Jan. 27, 2011, entitled "AN EQUALISER FOR WIRELESS RECEIVERS WITH NORMALISED COEFFICIENTS," which was published in English under International Publication Number WO 2011/092256 A1 on Aug. 4, 2011, and has a priority date of Jan. 29, 2010, based on application GB 1001488.4, Both of the above applications are commonly assigned with this National Stage application and are incorporated herein by reference in their entirety.

The invention relates to an equaliser for a wireless receiver, particularly but not exclusively to a Least-Squares (LS) equaliser or any other equaliser algorithm which uses the correlation between the received signal and a transmitted data sequence.

Channel equalisation techniques have been widely employed over the last decades for combating intersymbol interference on frequency selective transmission channels. Channel equalisers have recently found application in receivers for Time-Division Multiple Access (TDMA) and Code-Division Multiple Access (CDMA) mobile wireless systems. In particular, in synchronous CDMA cellular systems, as in the case of the forward link of the 3GPP Wideband Code-Division Multiple Access (WCDMA) standard, chip-level equalisation allows to significantly improve the performance of conventional rake receivers. This improvement is especially important for high rate data transmission, as in 3GPP High-Speed Downlink Packet Access (HSDPA).

Chip-level equalisers for HSDPA receivers are typically linear equalisers based on a transversal filter structure, for both the cases of single-channel and multiple antenna reception. The calculation of the chip-level equaliser coefficients may be based on the Minimum Mean-Square Error (MMSE) criterion or on the Least-Squares (LS) criterion, implemented either by an adaptation rule or by block processing. For most conditions, linear equalisers provide a good trade-off between performance and computational complexity, but their operation is seriously limited in the presence of specific channel conditions. The performance of single-channel and receive diversity equalisation may be improved by a nonlinear equaliser structure, as, e.g., with decision-feedback equalisation. However, in the case of an HSDPA receiver, the implementation of a decision-feedback equaliser requires a significant additional cost.

With respect to the calculation of the equaliser coefficients, the conventional MMSE criterion has the disadvantage of relying on specific assumptions on the statistics of the input disturbance (noise-plus-interference). In this respect, a more robust approach may be provided by computing the equaliser coefficients based on the minimization of the LS cost. LS equalisers can be implemented either in the time domain or in the frequency domain. In a frequency-domain implementation, the equaliser input signal is converted to the frequency domain by a Discrete Fourier Transform (DFT), which can be efficiently implemented by means of the Fast Fourier Transform (FFT). In this case, both the calculation of the equaliser coefficients and the derivation of the equaliser output samples are performed in the frequency domain, and the equaliser output is then converted back to the time domain by means of Inverse FFT (IFFT).

Differently from the MMSE equaliser, which minimizes the statistical expectation of the squared error, and hence relies on ensemble averages, the LS equaliser coefficients are obtained from short-term (sample) averages, without any assumption on the statistics of the noise-plus-interference.

Conventional LS equalisers rely on the knowledge of the transmitted data sequence over a given observation interval. More specifically, in a conventional LS equaliser the calculations of the LS equaliser coefficients uses the knowledge of the transmitted data $\{d_k\}_{k=0}^{K-1}$. In the case of a CDMA system, this would require the knowledge of the composite transmitted chip sequence. However, the known pilot symbols are code multiplexed with the data and control channels, and therefore at any given time the receiver has knowledge of only a portion of the equaliser input signal.

It is an aim of the present invention to provide an LS equaliser which is effective for a CDMA receiver.

The invention provides a method of equalising a radio signal comprising a sequence of data samples multiplexed with a sequence of pilot samples, the method comprising:
  calculating equaliser coefficients by computing cross-correlations of the received signal and known pilot samples available at the receiver and autocorrelations of the received signal; and
  equalising the received signal using the calculated coefficients.

The invention further provides a method of processing a radio signal transmitted over a data channel in a wireless communication system and comprising a composite transmitted chip sequence of data samples multiplexed with pilot samples, the method comprising equalising the received signal using equaliser coefficients calculated by computing cross-correlations of the received signal and known pilot samples available at the receiver and auto-correlations of the received signal;

The invention further provides an equaliser for equalising a radio signal comprising a sequence of data samples multiplexed with a sequence of pilot samples, the equaliser comprising:
  means for receiving a sequence of known pilot samples and calculating equaliser coefficients by computing cross-correlations of the received signal and known pilot samples available at the receiver and auto-correlations of the received signal; and
  means for equalising the received signal using the calculated coefficients.

The invention further provides a radio receiver comprising a wireless interface operable to receive a radio signal transmitted over a data channel in a wireless communication system, the data channel comprising a composite transmitted chip sequence of data samples multiplexed with pilot samples; and
  an equaliser operable to equalise the received signal using equaliser coefficients calculated by computing cross-correlations of the received signal and known pilot samples available at the receiver and auto-correlations of the received signal The invention further provides a computer program product comprising program code means which when executed by a processor implement a method as defined above.

The pilot samples available at the receiver can be derived in a number of ways. They can be stored at the receiver as known pilot symbols from which the samples are generated, or can be stored as samples. Alternatively, they can be derived from the transmitted pilot channel in a manner known per se.

The cross correlations and autocorrelations can be combined to generate the equaliser coefficients in the frequency or time domain, e.g., in accordance with a LS algorithm.

Embodiments of the present invention provide a solution for Least-Squares (LS) equalisation for a Code Division Multiple Access (CDMA) system, based on the component of the equaliser input signal corresponding to known code multiplexed pilot symbols. Particularly, but not exclusively, the invention applies to equalisation and interference rejection for the 3GPP Wideband Code-Division Multiple Access (WCDMA)/High-Speed Downlink Packet Access (HSDPA) standard. Preferred embodiments also address the implementation issues related to the overall scaling of the proposed LS equaliser.

Figure 2:
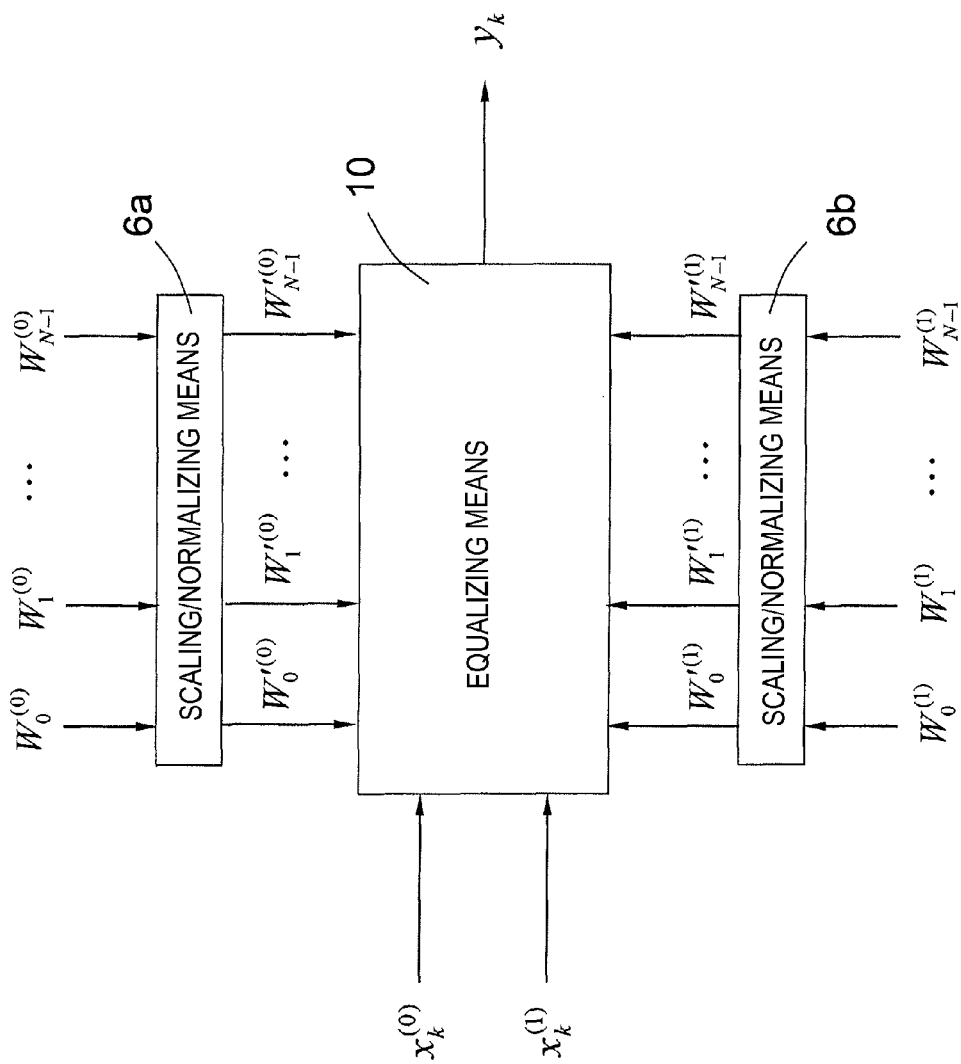

For a better understanding of the present invention and to show how the same may be carried into effect, reference will now be made by way of example to the accompanying drawings in which:

FIG. 1 is a block diagram of a LS equaliser in accordance with an embodiment of the invention for the case of dual antenna receive diversity, or any equivalent situation corresponding to two received signal subchannels, including the case where the subchannels are obtained by means of oversampling, including the case where the calculation of the equaliser coefficients is performed in the frequency domain; and FIG. 2 is a schematic block diagram illustrating an equaliser with coefficient scaling for the case where the calculation of the equaliser coefficients is performed in the frequency domain.

Before describing embodiments of the present invention, there is described by way of background relevant operation of a CDMA system and an LS equaliser. It will be appreciated that while implementing means are described and illustrated herein as functional blocks, they could in practice, be implemented in any suitable manner, including hardware or software. In the latter case, the various implementing means are code sequences stored in a memory and executable on a processor.

Consider the downlink transmission of a synchronous CDMA system, and assume the received discrete-time signal model $$x_i = \sum_n d_n h_{i-nM} + n_i \qquad (1)$$

where $x_i = x(iT_c/M)$ are the received signal samples taken at rate $T_c/M$, with $T_c$ denoting the chip interval and M the oversampling ratio, $h_i = h(iT_c/M)$ are the rate $T_c/M$ samples of the complex equivalent channel impulse response, which is assumed stationary for the time interval of interest, $d_k$ represents the complex multiuser transmitted chip sequence, and $n_i = n(iT_c/M)$ is a complex additive disturbance, which models thermal noise and intercell interference.

In the model (1), the channel impulse response includes the effect of the transmit and receive equivalent filters, which in the case of a WCDMA receiver are assumed root raised cosine filters with roll-off 0.22. The noise-plus-interference samples $n_i$ are assumed to derive from a process $v_i = v(iT_c/M)$, filtered by a low-pass filter with impulse response $g_i = g(iT_c/M)$ representing the equivalent receive filter. No assumption is made on the statistics of the additive noise-plus interference process $v_i$. In particular, $v_i$ is not necessarily white and is not assumed to be Gaussian.

The oversampled sequence $x_i$ can be decomposed into M chip rate subsequences relative to M distinct subchannels. In vector notation, we define for the k-th chip interval $$x_k^{(m)} = [x_{kM+m} x_{(k+1)M+m} \cdots x_{(k+N-1)M+m}]^T, \\ m=0,\ldots,M-1 \qquad (2)$$

where $(\bullet)^T$ indicates vector transpose.

In the case of time-domain block linear equalization, denoting by $w_k^{(m)}$ the N-dimensional vector of the equaliser coefficients relative to the m-th subchannel, the equaliser output at time k can then be written as $$y_k = y(kT_c) = \sum_{l=0}^{MN-1} w_l x_{k-l} = w_k^{(0)T} x_k^{(0)} + \ldots + w_k^{(M-1)T} x_k^{(M-1)}. \qquad (3)$$

Define the MN×1 vectors $w_k = [w_k^{(0)T} \ldots w_k^{(M-1)T}]^T$ and $x_k = [x_k^{(0)T} \ldots x_k^{(M-1)T}]^T$. With this notation, the output of the chip-level channel equaliser results $$y_k = w_k^T x_k. \qquad (4)$$

Note that the above model of a fractionally equaliser with $T_c/M$ spaced coefficients also applies when all or some of the M chip rate subchannels correspond to the signal samples obtained from multiple receive antennas.

Consider now the residual disturbance at the equaliser output, given by the error signal $$e_k = y_k - d_k. \qquad (5)$$

Assume the knowledge of the transmitted data sequence $\{d_k\}_{k=0}^{K-1}$ or the calculation of the equaliser weights w. In this case, introducing the vectors $y = [y_{N-1} \ldots y_{K-1}]^T$, $d = [d_{N-1} \ldots d_{K-1}]^T$ and $e = y - d = [e_{N-1} \ldots e_{K-1}]^T$, we can write in compact form $$y = Aw \qquad (6)$$

with the (K−N+1)×MN matrix $A = [x_{N-1} \ldots x_{K-1}]^T$. The conventional training-based linear LS algorithm minimizes the cost $$J(w) = \|e\|^2 = \sum_{k=N-1}^{K-1} |e_k|^2 \qquad (7)$$

over the training interval. From equation (7) we have $J(w) = w^H A^H A w - 2\text{Re}[w^H A^H d] + d^H d$, where $(\bullet)^H$ denotes Hermitian transpose, and, provided that A is full rank, one obtains the LS solution $$w_{(opt)} = \underset{w}{\arg\min} J(w) = R^{-1} p, \qquad (8)$$

where $$R = \frac{1}{K-N+1} A^H A = \frac{1}{K-N+1} \sum_{k=N-1}^{K-1} x_k^* x_k^T \qquad (9)$$

is the time-averaged correlation matrix of the equaliser input, and $$p = \frac{1}{K-N+1}A^H d = \frac{1}{K-N+1}\sum_{k=N-1}^{K-1} x_k^* d_k \quad (10)$$

is the time-averaged cross-correlation vector between the equaliser input and the transmitted data.

For M=2 chip-rate subchannels, e.g., in the case of dual antenna receive diversity, (8) derives from the equations $$\sum_{i=0}^{N-1} w_i^{(0)} r_{l-i}^{(0,0)} + \sum_{i=0}^{N-1} w_i^{(1)} r_{l-i}^{(1,0)} = p_l^{(0)} \quad (11)$$

$$\sum_{i=0}^{N-1} w_i^{(0)} r_{l-i}^{(0,1)} + \sum_{i=0}^{N-1} w_i^{(1)} r_{l-i}^{(1,1)} = p_l^{(1)}, \quad (12)$$

where $$r_l^{(0,0)} = \frac{1}{K-N+1}\sum_{k=N-1}^{K-1} x_k^{(0)} x_{k-l}^{(0)*} \quad (13)$$

$$r_l^{(1,1)} = \frac{1}{K-N+1}\sum_{k=N-1}^{K-1} x_k^{(1)} x_{k-l}^{(1)*} \quad (14)$$

$$r_l^{(0,1)} = \frac{1}{K-N+1}\sum_{k=N-1}^{K-1} x_k^{(0)} x_{k-l}^{(1)*} \quad (15)$$

$$r_l^{(1,0)} = r_{-l}^{(0,1)*} \quad (16)$$

$$p_l^{(0)} = \frac{1}{K-N+1}\sum_{k=N-1}^{K-1} d_k x_{k-l}^{(0)*} \quad (17)$$

$$p_l^{(1)} = \frac{1}{K-N+1}\sum_{k=N-1}^{K-1} d_k x_{k-l}^{(1)*}. \quad (18)$$

For a frequency-domain LS equaliser, denote by $W_k^{(m)}$, $k=0, \ldots, N_f-1$, the DFT of the equaliser coefficients $w_l^{(m)}$, $m=0, 1$, by $R_k^{m_1,m_2}$, $k=0, \ldots, N_f-1$, the DFT of the time-averaged auto-correlation of the received signal $r_l^{(m_1,m_2)}$, $m_1$, $m_2=0, 1$, and by $P_k^{(m)}$, $k=0, N_f-1$, the DFT of the time-averaged cross-correlation between the received signal and the transmitted data $p_l^{(m)}$, $m=0, 1$. Then, from (11), (12), taking into account that $r_l^{(1,0)}=r_{-l}^{(0,1)*} \Rightarrow R_k^{(1,0)}=R_k^{(0,1)*}$, $$W_k^{(0)} R_k^{(0,0)} + W_k^{(1)} R_k^{(0,1)*} = P_k^{(0)} \quad (19)$$

$$W_k^{(0)} R_k^{(0,1)} + W_k^{(1)} R_k^{(1,1)} = P_k^{(0)}, \quad (20)$$

and $$W_k^{(0)} = \frac{P_k^{(0)} R_k^{(1,1)} - P_k^{(1)} R_k^{(0,1)*}}{R_k^{(0,0)} R_k^{(1,1)} - |R_k^{(0,1)}|^2} \quad (21)$$

$$W_k^{(1)} = \frac{P_k^{(1)} R_k^{(0,0)} - P_k^{(0)} R_k^{(0,1)}}{R_k^{(0,0)} R_k^{(1,1)} - |R_k^{(0,1)}|^2}. \quad (22)$$

In the case of M=1 chip-rate subchannel, (11)-(22) simplify to $$\sum_{i=0}^{N-1} w_i r_{l-i} = p_l \quad (23)$$

$$r_l = \frac{1}{K-N+1}\sum_{k=N-1}^{K-1} x_k^{(0)} x_{k-l}^{(0)*} \quad (24)$$

$$p_l = \frac{1}{K-N+1}\sum_{k=N-1}^{K-1} d_k x_{k-l}^{(0)*}, \quad (25)$$

and, denoting by $W_k$, $R_k$ and $P_k$, $k=0, \ldots, N_f-1$, respectively the DFT of the equaliser coefficients $w_l$, of the time-averaged auto-correlation $r_l$, and of the time-averaged cross-correlation $p_l$, $$W_k R_k = P_k \quad (26)$$

which gives $$W_k = \frac{P_k}{R_k}. \quad (27)$$

As mentioned above, the operations of DFT and inverse DFT can be efficiently implemented by means of $N_f$-point Fast Fourier Transform (FFT) and Inverse Fast Fourier Transform (IFFT).

As already mentioned, the composite multiuser transmitted chip sequence in a CDMA system does not lend itself to application in an LS equaliser, because at any given time the receiver knows only a portion of the input signal, since the known pilot symbols are code multiplexed with the data and control channels.

Each cell in a wideband CDMA system transmits a special constant power downlink channel known as the common pilot channel (CPICH) on a fixed OVSF code (as discussed for example in the 3GPP specification TS 25.211, "Technical Specification Group Radio Access Network; Physical Channels and Mapping of Transport Channels onto Physical Channels (FDD)", December 2005). The CPICH is transmitted with a fixed, predetermined data pattern and has known uses for channel estimation and signal-to-interference ratio (SIR) estimation. Here, it is used for another purpose.

The pilot channel is associated with the data channel in the sense that it is transmitted through the same wireless environment at substantially the same time.

The proposed solution allows the implementation of LS equalization for a CDMA receiver, where the known pilot symbols are code multiplexed with the data and control channels. It will now be described with reference to FIG. 1.

Consider the case of a 3GPP WCDMA/HSDPA downlink receiver, where a Common Pilot Channel (CPICH) is transmitted with an offset $\eta_{CPICH}$=CPICH $E_c/I_{or}$ with respect to the total downlink transmitted power spectral density $I_{or}$, and denote by $I_{oc}$, the noise plus inter-cell interference power spectral density at the mobile terminal or User Equipment (UE) receiver.

There is described herein a LS equaliser function 4 comprising calculating means 8 for calculating equaliser coefficients. Although in FIG. 1 the block 8 is shown to produce frequency-domain equaliser coefficients $\{W_k^m\}_{k=0}^{K-1}$, the description also applies to the case where the block 8 produces time-domain equaliser coefficients $\{w_l^m\}_{k=0}^{K-1}$.

In the calculating means block 8 of FIG. 1, where the time-averaged cross-correlation vector of equation (10) or the time-averaged cross-correlation components of equations (17), (18) or (25), or their corresponding frequency-domain quantities, are computed using the CPICH chip sequence $\{\tilde{d}_k\}_{k=0}^{K-1}$ instead of the overall composite chip sequence $\{d_k\}_{k=0}^{K-1}$, with $E\{|\tilde{d}_k|^2\}=\eta_{CPICH}E\{|d_k|^2\} \propto \eta \mathbf{1}_{CPICH} I_{or}$. In this case, referring for instance to the frequency-domain LS equaliser implementation for the case of M=1 chip-rate sub-channel, (25) becomes $$p_l = \frac{1}{K-N+1}\sum_{k=N}^{K}\tilde{d}_k x_{k-l}^{(0)*}, \tag{28}$$

and the corresponding DFT $P_k$ is scaled proportionally to $\sqrt{\eta_{CPICH} I_{or}}$ $$P_k \propto \sqrt{\eta_{CPICH} I_{or}} H_k^{(0)*}. \tag{29}$$

The time-averaged auto-correlation components for calculation of the equaliser coefficients are computed as described above with reference to Equations (9), (13)-(16) or (24).

The equaliser coefficients combine the cross-correlations and autocorrelations as described above, using the novel cross-correlation computation, as expressed for M=1 sub-channel by Equation (28), in the calculating means 8.

Considering that the DFT $R_k$ of the time-averaged signal correlation $r_l$ is scaled as the total received signal plus interference power $I_{or}|H_k^{(0)}|^2+I_{oc}=\hat{I}_{or}+I_{oc}$, we have for the frequency domain equaliser coefficients (27)

$$W_k \propto \sqrt{\eta_{CPICH} I_{or}} \cdot \frac{H_k^{(0)*}}{I_{or}|H_k^{(0)}|^2 + I_{oc}}. \tag{30}$$

Since the equaliser input scales as $\sqrt{I_{or}|H_k^{(0)}|^2+I_{oc}}$, the total power at the equaliser output is then proportional to $$g^2 \approx \eta_{CPICH} \cdot \frac{I_{or}|H_k^{(0)}|^2}{I_{or}|H_k^{(0)}|^2 + I_{oc}}. \tag{31}$$

The equalising means are shown implemented in the block 10. FIG. 1 represents a frequency-domain equaliser with M=2 chip-rate subchannels, or in general an equaliser where the calculation of the equaliser coefficients is performed in the frequency domain. However, as already mentioned, the same block diagram also applies to the case of a time-domain equalizer with M=2 chip-rate subchannels. It will be appreciated that the invention also applies where M=1.

One issue that can arise with the above implementations using the CPICH chip sequence $\{\tilde{d}_k\}_{k=0}^{K-1}$ is that the equaliser output amplitude is not as well conditioned as in the case where the equaliser design were to be based on the knowledge of the whole transmitted data sequence $\{d_k\}_{k=0}^{K-1}$; over the given observation interval. The scaling $\eta_{CPICH}$ in (31) is not only unknown at the receiver, but is also potentially subject to abrupt changes, caused by short-term variations of the transmitted signal power spectral density $I_{or}$, which translate directly into corresponding changes of $\eta_{CPICH}$=CPICH $E_c/I_{or}$.

The effect of the above variations of the equaliser output power may be particularly detrimental if these happen to interact with the filtering operations for the estimation of the signal and interference power at the equaliser output, which in an HSDPA receiver are essential for Log Likelihood Ratios (LLR) calculation and Channel Quality Indications (COI) report.

One possible solution shown in FIG. 2 is to realize a scaling of the equaliser coefficients that does not depend on the quantity $\eta_{CPICH}$. In the case of calculation of the equaliser coefficients in the frequency domain, this can be done by normalizing the coefficients (30), for instance based on a quantity $$\overline{W}=f(W_k), \tag{32}$$

where $f(W_k)$ is a function of the frequency-domain equaliser coefficients $W_k$, k=0, ..., $N_f$–1. For instance, one may consider $$f(W_k) = \sqrt{\frac{1}{K}\sum_{k=1}^{K}|W_k|^2} \tag{33}$$

and compute the normalized frequency-domain equaliser coefficients as $$W_k' = \frac{1}{\overline{W}} W_k. \tag{34}$$

Using (32)-(34), the total power at the equaliser output results proportional to $$g'^2 \approx I_{or}|H_k^{(0)}|^2+I_{oc}. \tag{35}$$

Alternatively, one may normalize the equaliser coefficients (30) based on a quantity $$\overline{W}=f(W_k,P_k), \tag{36}$$

where $f(W_k,P_k)$ is a function of the frequency domain coefficients $W_k$ and the DFT of time-averaged cross-correlation $P_k$, k=0, ..., $N_f$–1.

The scaling/normalising function is denoted 6a, 6b in FIG. 2.

The above description refers as a way of example to the case of calculation of the LS equaliser coefficients in the frequency domain. However, an analogous approach may be correspondingly implemented in the conventional case where the LS equaliser coefficients are calculated in the time domain.

The invention claimed is:

1. A computer program product comprising program code stored on a non-transitory computer readable medium which, when executed by a processor, implements a method of equalising a radio signal at a receiver, the method comprising:
   calculating Least Square (LS) equaliser coefficients by computing cross-correlations of a received signal and known pilot samples stored at the receiver and auto-correlations of the received signal;
   normalizing the calculated LS equaliser coefficients; and
   equalising the received signal using the normalized LS equaliser coefficients;
   wherein said radio signal includes a sequence of data samples multiplexed with a sequence of pilot samples.

2. A computer program product comprising program code stored on a non-transitory computer readable medium which, when executed by a processor, implements a method of processing a radio signal transmitted over a data channel in a wireless communication system at a receiver, the method comprising:

equalising a received signal using equaliser coefficients calculated by computing cross-correlations of the received signal and known pilot samples stored at the receiver and auto-correlations of the received signal;
wherein the data channel includes a composite transmitted chip sequence of data samples multiplexed with pilot samples.

3. A computer program product according to claim 1, wherein the LS equaliser coefficients are calculated by combining the cross-correlations and the auto-correlations to implement a LS algorithm.

4. A computer program product according to claim 1, wherein the calculated LS equaliser coefficients are normalized based on a function of the LS equaliser coefficients.

5. A computer program product according to claim 1, wherein the known pilot samples are stored at the receiver as known pilot symbols from which the known pilot samples are generated.

6. An equaliser for equalising a radio signal at a receiver, the equaliser comprising:
means for receiving a sequence of known pilot samples and calculating equaliser coefficients by computing cross-correlations of a received signal and known pilot samples stored at the receiver and auto-correlations of the received signal, the radio signal including a sequence of data samples multiplexed with a sequence of pilot samples; and
means for equalising the received signal using the equaliser coefficients.

7. An equaliser according to claim 6, wherein the equaliser coefficients are calculated combining the cross-correlations and the auto-correlations to implement a Least Squares (LS) algorithm.

8. An equaliser according to claim 6, which comprises normalising means for normalising the equaliser coefficients prior to using the equaliser coefficients to equalise the received signal.

9. A radio receiver comprising:
a wireless interface operable to receive a radio signal transmitted over a data channel in a wireless communication system, the data channel comprising a composite transmitted chip sequence of data samples multiplexed with pilot samples; and
an equaliser operable to equalise a received signal using equaliser coefficients calculated by computing cross-correlations of the received signal and known pilot samples stored at the receiver and auto-correlations of the received signal.

10. A radio receiver according to claim 9, comprising a processor, wherein the equaliser is implemented as a code sequence executed on the processor.

11. A radio receiver according to claim 9, wherein the equaliser comprises a normaliser for normalising the equaliser coefficients prior to using the equaliser coefficients to equalise the received signal.

12. A radio receiver according to claim 9, wherein the equaliser coefficients are calculated by combining the cross-correlations and the auto-correlations to implement a Least Squares (LS) algorithm.

13. A computer program product according to claim 2, wherein the equaliser coefficients are calculated by combining the cross-correlations and the auto-correlations to implement a Least Squares (LS) algorithm.

14. A computer program product according to claim 2, further comprising normalising the equaliser coefficients prior to using the equaliser coefficients to equalise the received signal.

15. A computer program product according to claim 2, wherein the data channel is code division multiplexed.

16. An equaliser according to claim 7, which comprises normalising means for normalising the equaliser coefficients prior to using the equaliser coefficients to equalise the received signal.

17. A radio receiver according to claim 10, wherein the calculation of equaliser coefficients comprises combining the cross-correlations and the auto-correlations to implement a Least Squares (LS) algorithm.

18. A radio receiver according to claim 11, wherein the equaliser coefficients are calculated by combining the cross-correlations and the auto-correlations to implement a Least Squares (LS) algorithm.

19. A computer program product according claim 1, wherein the calculated LS equaliser coefficients are normalized based on a function of the calculated LS equaliser coefficients and the cross-correlations.

20. The computer program product according to claim 1, wherein the receiver is a CDMA receiver.

* * * * *